(12) United States Patent
Jeffery et al.

(10) Patent No.: US 9,773,252 B1
(45) Date of Patent: Sep. 26, 2017

(54) DISCOVERY OF NEW BUSINESS OPENINGS USING WEB CONTENT ANALYSIS

(71) Applicant: Groupon, Inc., Chicago, IL (US)

(72) Inventors: Shawn Ryan Jeffery, Burlingame, CA (US); Nick Pendar, San Ramon, CA (US); Richard Clark Barber, Campbell, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 14/808,918

(22) Filed: Jul. 24, 2015

Related U.S. Application Data

(63) Continuation of application No. 13/797,570, filed on Mar. 12, 2013, now Pat. No. 9,122,710.

(51) Int. Cl.
*G06F 17/30* (2006.01)
*G06Q 30/02* (2012.01)

(52) U.S. Cl.
CPC ... *G06Q 30/0201* (2013.01); *G06F 17/30864* (2013.01)

(58) Field of Classification Search
CPC ............ G06F 17/30864; G06Q 30/0201
USPC .......................................................... 707/722
See application file for complete search history.

(56) References Cited

U.S. PATENT DOCUMENTS

| | | | |
|---|---|---|---|
| 5,530,852 A | 6/1996 | Meske et al. | |
| 5,937,418 A | 8/1999 | Ferris et al. | |
| 6,148,289 A | 11/2000 | Virdy | |
| 6,401,091 B1 | 6/2002 | Butler et al. | |
| 6,523,021 B1 | 2/2003 | Monberg et al. | |
| 6,691,105 B1 | 2/2004 | Virdy | |
| 6,996,589 B1 | 2/2006 | Jayaram et al. | |
| 7,493,308 B1 | 2/2009 | Bair et al. | |
| 7,581,166 B2 | 8/2009 | Renger et al. | |

(Continued)

OTHER PUBLICATIONS

Seneff, Stephanie, et al., "A New Restaurant Guide Conversational System: Issues in Rapid Prototyping for Specialized Domains", ICSLP 1996, Philadelphia, PA, Oct. 3-6, 1996, pp. 665-668.*

(Continued)

*Primary Examiner* — Robert Stevens
(74) *Attorney, Agent, or Firm* — Alston & Bird LLP

(57) ABSTRACT

In general, embodiments of the present invention provide systems, methods and computer readable media for identifying a new business based on programmatically analyzing content received from online sources and, as a result, discovering one or more references to the business. In embodiments, the system stores historical data representing previously identified new businesses and then uses attributes of those businesses in search queries to receive related content. Additionally or alternatively, the system stores data representing online sources that historically provided content containing references to new businesses and then continues to access those sources for additional content. In embodiments, the system performs content analysis on structured and/or unstructured content. In some embodiments, analysis of content received from a particular online source includes a source-specific algorithm that takes a source-specific representation of the content as input and produces a result indicating the likelihood that the content includes a new business reference.

13 Claims, 5 Drawing Sheets

(56) References Cited

U.S. PATENT DOCUMENTS

| | | | |
|---|---|---|---|
| 7,676,455 | B2 | 3/2010 | Ursitti et al. |
| 7,822,757 | B2 | 10/2010 | Stoker et al. |
| 8,150,731 | B1 | 4/2012 | Whitten et al. |
| 8,166,013 | B2 | 4/2012 | Bandaru et al. |
| 8,346,790 | B2 | 1/2013 | Stoker et al. |
| 8,566,115 | B2 | 10/2013 | Moore |
| 8,601,578 | B1 | 12/2013 | Gertzenstein et al. |
| 8,606,845 | B2 | 12/2013 | Dickinson et al. |
| 9,218,420 | B1 * | 12/2015 | Murphy ............ G06F 17/30864 |
| 2002/0161778 | A1 | 10/2002 | Linstedt |
| 2003/0061232 | A1 * | 3/2003 | Patterson .......... G06F 17/30861 |
| 2003/0195868 | A1 | 10/2003 | Wilson et al. |
| 2004/0204958 | A1 | 10/2004 | Perkins et al. |
| 2005/0027590 | A9 | 2/2005 | Gailey et al. |
| 2005/0060286 | A1 | 3/2005 | Hansen et al. |
| 2005/0149507 | A1 | 7/2005 | Nye |
| 2005/0216507 | A1 | 9/2005 | Wright |
| 2005/0278309 | A1 * | 12/2005 | Evans ................ G06F 17/3087 |
| 2006/0100980 | A1 | 5/2006 | Reed et al. |
| 2006/0149624 | A1 | 7/2006 | Baluja et al. |
| 2007/0204025 | A1 | 8/2007 | Cox et al. |
| 2008/0065974 | A1 | 3/2008 | Campbell |
| 2008/0133488 | A1 | 6/2008 | Bandaru et al. |
| 2009/0063470 | A1 * | 3/2009 | Peled .................... G06F 17/278 |
| 2009/0119268 | A1 | 5/2009 | Bandaru et al. |
| 2009/0234853 | A1 * | 9/2009 | Gupta ............... G06F 17/30864 |
| 2010/0036806 | A1 * | 2/2010 | Lam ................... G06F 17/3087 707/706 |
| 2011/0137705 | A1 | 6/2011 | Srinivasan |
| 2011/0145720 | A1 * | 6/2011 | Glasgow ................ G06Q 10/10 715/739 |
| 2012/0316974 | A1 | 12/2012 | Sanders et al. |
| 2013/0007063 | A1 * | 1/2013 | Kalra ................ G06F 17/30893 707/796 |

OTHER PUBLICATIONS

Rozsnyai, Szabolcs, et al., "Event Cloud—Searching for Correlated Business Events", CEC-EEE 2007, IEEE, © 2007, pp. 1-8.*
The Microsoft Dictionary, 5th Edition, Microsoft Press, Redmond, WA, © 2002, pp. 141, 146, 169-270 and 450.*
Chaudhuri, Surajit, et al., "An Overview of Business Intelligence Technology", Communications of the ACM, vol. 54, No. 8, Aug. 2011, pp. 88-98.*
Chaudhuri, et al., "An Overview of Business Intelligence Technology," *Communications of the ACM*, 54(8):88-98, (Aug. 2011).
Peng, et al., "Accessing existing business data from the World Wide Web," *IBM Systems Journal*, 37(1):115-132 (Copyright 1998).
Seneff, et al., "A New Restaurant Guide Conversational System: Issues in Rapid Prototyping for Specialized Domains," *ICSLP 1996*, pp. 665-668, (Oct. 3-6, 1996).
Tiwari, et al., "A Web Usage Mining Framework for Business Intelligence," *ICCSN 2011*, pp. 731-734 (May 27-29, 2011).
Yu, et al., "Understanding Mashup Development," *IEEE Internet Computing*, Issue 5, pp. 44-52 (Sep./Oct. 2008).
Gill, "Blogging, RSS and the Information Landscape: A Look At Online News," WWW 2005 workshop on the weblogging ecosystem, pp. 1-7 (Copyright 2005).
Rozsnyai, et al., "Event Cloud—Searching for Correlated Business Events," CEC-EEE 2007, IEEE, pp. 1-8, (Copyright 2007).
Gangadharan, "Business Intelligence Systems: Design and Implementation Strategies," 26th Int. Conf. Information Technology Interfaces ITI 2004, pp. 139-144, (Jun. 7-10, 2004).
Koudas, et al. "Data Stream Query Processing," AT&T Labs—Research, pp. 1-131, (Apr. 15, 2005).
U.S. Appl. No. 13/797,570, Non-Final Office Action mailed Dec. 4, 2014, 11 pages.
U.S. Appl. No. 13/797,570, Notice of Allowance mailed May 5, 2015, 8 pages.

* cited by examiner

DISCOVERY OF NEW BUSINESS OPENINGS USING WEB CONTENT ANALYSIS

CROSS-REFERENCE TO RELATED APPLICATIONS

This application is a continuation of U.S. patent application Ser. No. 13/797,570, entitled "DISCOVERY OF NEW BUSINESS OPENINGS USING WEB CONTENT ANALYSIS," and filed Mar. 12, 2013, the entire contents of which are hereby incorporated by reference.

FIELD OF THE INVENTION

Embodiments of the invention relate, generally, to automatic early identification of new business openings based on web content analysis.

BACKGROUND OF THE INVENTION

Current methods for identification of new providers of goods, services and/or experiences exhibit a plurality of problems that make current systems insufficient, ineffective and/or the like. Through applied effort, ingenuity, and innovation, solutions to improve such methods have been realized and are described in connection with embodiments of the present invention.

BRIEF SUMMARY OF THE INVENTION

In general, embodiments of the present invention provide herein systems, methods and computer readable media for identifying a newly opened local business or business that is about to open (i.e., a new business) based on programmatically analyzing content received from or otherwise discovered in sources and, as a result, discovering one or more references to the business included in the content. For example, references to a business (i.e., a provider of goods, services and/or experiences) within online content may include the business name, the address of the business location, and/or the date of the business opening. In providing such functionality, the system can be configured to, for example, store historical data representing previously identified new businesses and then use attributes of those businesses in search queries to receive related content that likely includes references to additional new businesses. Additionally or alternatively, the system can be configured to, for example, store data representing online sources that historically provided content containing references to new businesses. In various embodiments, the system can use the stored data to continue accessing online sources for additional content via, for example, content feeds pushed from those sources. In some embodiments, data representing online sources are stored in a search index, and the system can continue to access the online sources by periodically crawling the sources stored in the search index and pulling in the content data being published by the sources.

In embodiments, the system is configured to perform content analysis on structured and/or unstructured content. In some embodiments, analysis of content received from a particular online source includes a source-specific algorithm that takes a source-specific representation of the content as input and produces a result indicating the likelihood that the content includes a new business reference.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
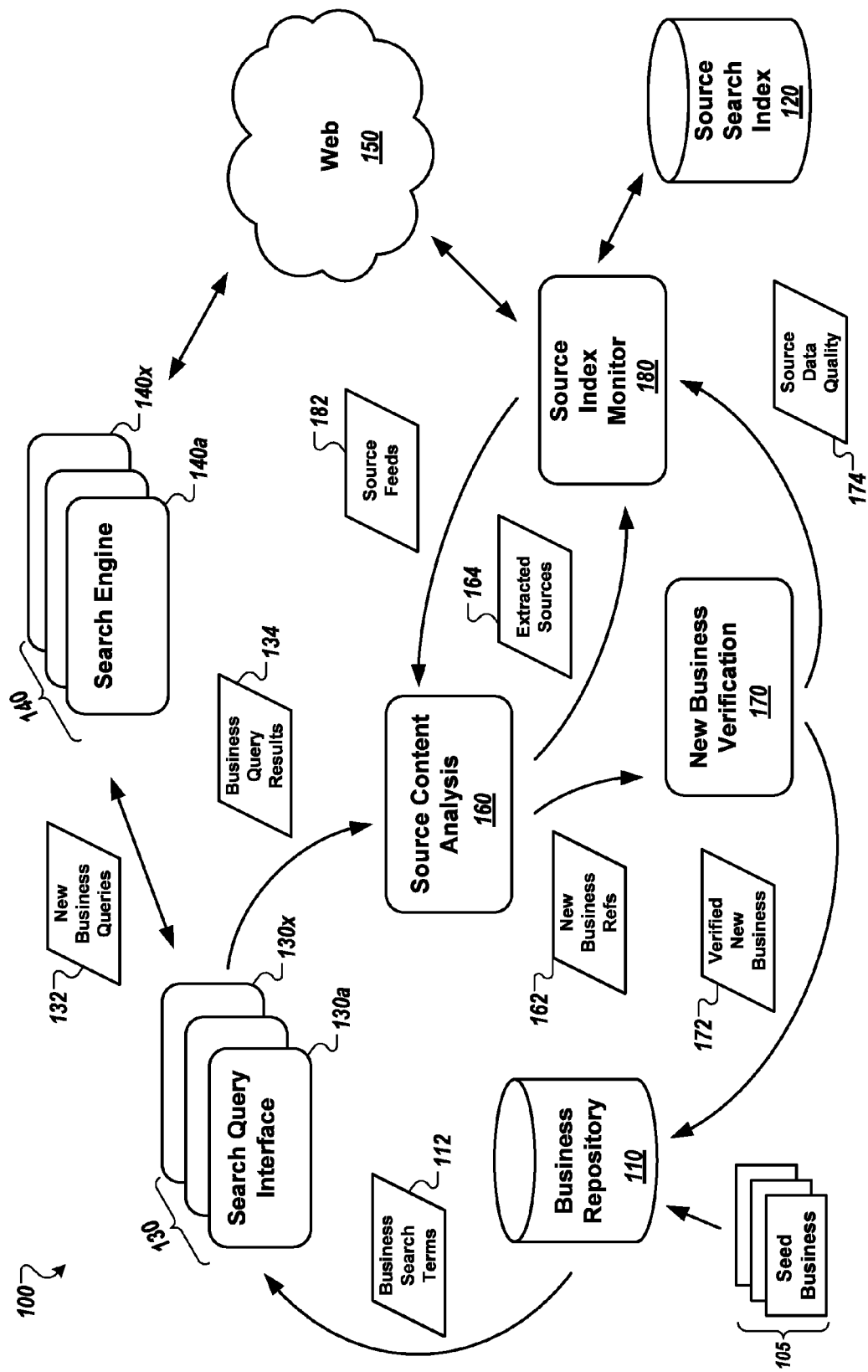
FIG. 1 illustrates an example system that can be configured to implement automatic early identification of new business openings based on analyzing content retrieved from online sources in accordance with some embodiments discussed herein.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Early identification of new businesses is important to service providers, e.g. business-to-business (B2B) service providers, who want to be among the first to offer their services to such businesses. A new business may be a local business that has recently opened (e.g., opened within the previous six months) or a business that is about to open. Conventionally, a service provider desiring clues to the identity of new businesses relies on publically accessible structured published information specifically about new businesses and/or results of searches for information in the content provided by web sources (e.g. blogs and specialized web sites) that are likely to publish the information.

Structured published information is widely available, and thus using this information does not provide much of a competitive advantage for a service provider desiring early identification of newly opened businesses. Searching through web sources is time consuming, and, since the data quality of web content varies, the information retrieved from the content provided by a web source may not be reliable.

Many web sources provide unstructured content, i.e., primarily text-based content that includes a variety of types of information such as dates, locations, and numbers. Conventionally, extraction of information from unstructured web content is performed using sophisticated content analysis methods. Additionally, no single content analysis method can be applicable to all unstructured web content, because each source typically publishes content using a source-specific representation of the content data.

In embodiments, discovery of new businesses may be implemented as an automated task that includes two task components: source discovery and business discovery. Source discovery is identifying reliable online sources, i.e., sources that are likely to publish high quality content for online access of information about new businesses via a network, typically the World Wide Web (the internet or the web, hereinafter). Business discovery is using attributes of identified new businesses (e.g. the business name and its location) to gather information about other new businesses. Content that includes attributes of a previously identified new business can be analyzed to discover attributes of additional new businesses. Source discovery and business discovery mutually reinforce each other, because if reliable sources are known to provide content that previously has identified new businesses, those sources also are likely to provide high quality content that identifies additional new businesses.

As such, and according to some example embodiments, the systems and methods described herein are therefore configured to identify new businesses and/or content sources that are likely to provide high-quality information on new businesses. In some example embodiments, content that can include references to new businesses may be received or otherwise determined from search results that are returned in response to a search query, from a content feed (e.g. an RSS feed), from a screen scrape, and/or the like. Received content is analyzed to determine whether the content includes one or more references to a new business. In some example embodiments, identification of a new business reference within content text may include identification of content text patterns associated with the reference such as keywords (e.g. "grand opening"), opening dates, business location (e.g. address or city), and/or an indication of goods, services or experiences to be provided by the new business.

Upon discovery of a new business or based on the discovery of a new business within content received from a particular source, the method, apparatus and computer program product may store data representing that source in a search index. As such, a method of retrieving additional information about new businesses may be determined for content received from that particular source.

Additionally, upon discovery of a new business, the method, apparatus and computer program product may store data representing the new business in a business repository. As such, attributes of a previously identified new business may be the basis for a method of retrieving information about businesses that share those attributes and thus may be likely to be new businesses.

FIG. 1 illustrates an example system 100 that can be configured to implement automatic identification of new business openings based on analyzing content retrieved from online sources. In embodiments, system 100 comprises a business repository 110 storing data that represent previously identified new businesses; a source search index 120 storing data that represent web sources that have published content referencing previously identified businesses; one or more search query interfaces (130a, . . . , 130x), where a search query interface 130 includes generating a new business query 132 and interfacing with at least one search engine (140a, . . . , 140x) by submitting the query 132 and receiving search results 134 returned by the search engine 140 in response to receiving the query 132; a source content analysis module 160 that includes analysis of the content included in search results 134; a new business verification module 170 that includes verifying each of a set of new businesses 162 referenced in analyzed source content; and a source index monitor 180 that includes maintenance of the source search index 120 by, for example, storing data 164 representing sources that have published content referencing new businesses and updating the source search index 120 based on source data quality signals 174 received as a result of new business verification.

In embodiments, the system 100 may be instantiated by storing a set of seed data 105 in the business repository 110. The seed data 105 represents previously identified new businesses, and data representing a particular business may include attributes of the business (e.g. business name, type of business, business location). Alternatively, in some embodiments, the system 100 may be instantiated by accessing a business repository 110 in which the set of seed data 105 are stored. In embodiments, the system 100 generates a new business search query 132 that includes one or more search terms 112 that are derived from stored attributes of a particular business.

In embodiments, the system 100 includes a search query interface 130 to each search engine 140 that receives a new business search query 132. In some embodiments, the system 100 can be configured to access one or more public search engines (e.g. Google or Bing), one or more proprietary search engines, or a combination. A particular search query interface may be associated with at least one particular search engine. The system 100 uses a search query interface 130 to generate a search query 132 in the format specified by its associated search engines 140. The system 100 uses the search query interface 130 to submit the search query 132 to a search engine 140 as well as to receive the search results 134 that are returned by the search engine 140 in response to receiving the search query 132.

Additionally or alternatively, the system 100 may use one or more of the search terms 112 in a keyword search of the content published by one or more online sources. For example, the system may search the content of a blog that posts restaurant reviews to determine if the name of a particular restaurant is included in the content.

In embodiments, the system 100 extracts content included in the search results 134 that are returned from a submitted new business query 132. The system 100 includes a source content analysis module 160 to identify and extract any references to new businesses 162 that are included in the content. In embodiments, one or more content analysis methods may be used to analyze the content data. In embodiments, the selection of content analysis methods to apply to particular source content may be based in part on a determination of whether the content is structured content or unstructured content. Content analysis for business discovery will be described in more detail below with respect to method 200.

In embodiments, the system 100 collects the references to new businesses 162 that are extracted as a result of source content analysis. In some embodiments, the system 100 generates a set of different new business references that were extracted over a pre-determined period of time. In embodiments, each extracted new business reference is verified. In some embodiments, new business verification 170 is performed as a manual process that includes visually verifying displayed content referencing a new business. For example, content referencing a particular business over a previous period of time may be analyzed to determine if the reference is to a newly opened business or to an existing business that opened in the past. Alternatively, in some embodiments, new business verification 170 is performed as an automatic process that includes further content analysis, for example, by causing one or more additional sources to be checked for an indication of the new business, by generating an automated communication to the new business, and/or the like. In some other embodiments, new business verification 170 includes a combination of manual and automatic processes. In embodiments, data representing each verified new business that is not known to the system 100 are stored in the business repository 110.

In embodiments, the system 100 also extracts from the search results 134 data representing each source 164 that provided the content that included a reference to a verified new business. In embodiments, the system 100 uses the extracted source data 164 to update the source search index 120 either by updating the stored data representing a known source or by storing data representing a newly discovered source. In embodiments, the results of new business verification 170 are included in calculating one or more source data quality signals 174 that are used to generate a confidence rating respectively associated with each extracted source. The confidence rating associated with each extracted source will be discussed in more detail below with respect to method 300.

In embodiments, the system 100 periodically receives content from sources represented in the source search index 120. In some embodiments, the system 100 receives content feeds 182 pushed from each source via its respective Rich Site Summary (RSS) feed. In some embodiments, the system 100 periodically pulls content from sources by crawling the sources represented in the source search index 120. In some embodiments, the system 100 receives content based on the source search index 120 by using a combination of content contained in RSS feeds and content returned by one or more crawler programs.

In embodiments, a source index monitor 180 maintains the quality of the source search index 120 by pruning sources that have been determined to no longer be reliable sources. In some embodiments, this determination is based in part on source data quality signals 174 resulting from source content analysis 160. For example, in some embodiments, a source may be pruned from the source search index 120 if its content has not included any further new business references within a predetermined period of time.

In embodiments, the system 100 extracts content included in source feeds 182 it has received and uses the source content analysis module 160 to identify and extract any references to new businesses 162 that are included in the content in the same way that the content extracted from business search query results 134 is analyzed.

Figure 2:
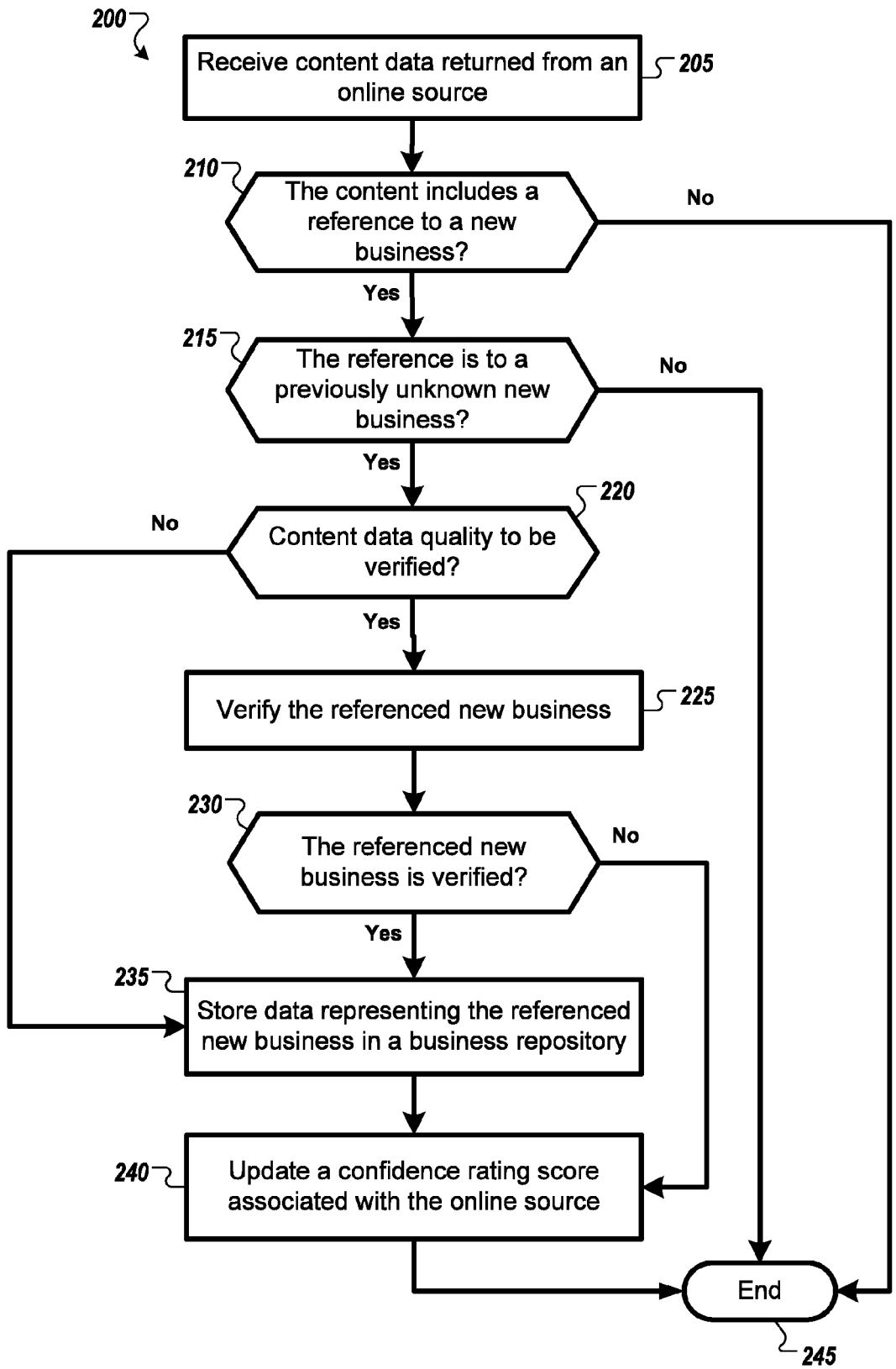
FIG. 2 is a flow diagram of an example method for performing analysis to identify references to a new business within content returned from an online source in accordance with some embodiments discussed herein.

FIG. 2 is a flow diagram of an example method 200 for performing analysis to identify references to a new business within content returned from an online source. For convenience, the method 200 will be described with respect to a system that includes one or more computing devices and performs the method 200. Specifically, the method 200 will be described with respect to processing of search results by the source content analysis module 160 and the new business verification module 170 of system 100.

In embodiments, the system receives 205 content data returned from an online source. In some embodiments, the content data was extracted from search query results 134, from content feeds (e.g. RSS feeds), and/or otherwise determined based on a source-specific analysis of the content. The system analyzes the received content data to determine 210 whether it includes at least one reference to a new business.

In some embodiments, content analysis is based in part on a determination of whether the source content is structured content or unstructured content. Structured content conforms to a pre-defined data model, e.g. fields in relational database tables, and additionally may include annotations or semantic tags, e.g. Extended Markup Language (XML) tags. Extracting information from structured content conventionally is performed using well-known algorithms based on patterns of the structuring of the content.

In contrast, unstructured content typically is text that contains information such as dates, numbers, and facts. In embodiments, extraction of information from text may require an algorithm specifically designed to recognize source-specific data representation patterns. In embodiments, an algorithm for identification of new business references may be designed to identify one or more text patterns such as particular keywords or phrases (e.g. "new" or "opened"), dates (e.g. the date a business opened), the name of a chef, and/or a particular location. For example, the content of a restaurant blog may include a reference to a restaurant name, such as TJ's Crab Shack, that is associated in the content with the name of a well-known seafood chef and is also associated with the key phrase "grand opening" and a recent date. Thus, the reference to TJ's Crab Shack may be identified by the system as a new business reference.

In embodiments, content analysis for identification of new business references includes a pattern recognition algorithm for processing text patterns extracted from content received from a particular source to determine the likelihood that the content will include new business references. Cluster analysis and classification algorithms are two examples of well-known pattern recognition algorithms that perform processing using statistical inference. In cluster analysis, an input pattern is assigned to one of several groups (clusters) of the same type of patterns. Patterns within the same cluster are likely to be more similar to each other than they are similar to patterns assigned to different clusters. A classification algorithm (i.e. classifier) maps an input pattern into one of several categories in which the pattern is most likely to belong.

Machine learning is often used to develop a particular pattern recognition algorithm (i.e. an algorithm that represents a particular pattern recognition problem) that is based on statistical inference. For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In embodiments, content analysis includes a source-specific classifier that takes a source-specific representation of the content received from a particular source as an input and produces an output that categorizes that input as being likely to include a new business reference or as being unlikely to include a new business reference. In some embodiments, the source-specific classifier is a trainable classifier that can be optimized as more instances of content for analysis are received from a particular source. Source-specific algorithms (and trainable classifiers in particular) are further discussed below with reference to method 300.

In embodiments, analysis ends 245 if the system determines 215 that received content does not include at least one new business reference.

In embodiments, the system determines 215 whether a referenced new business is already known to the system. In some embodiments, this determination is based on whether data representing the referenced new business is stored is a business repository. In embodiments, analysis ends 245 if the system determines 215 that a referenced new business already is known to the system.

If the system determines 215 that a previously unknown new business is referenced within the content data, the system determines 220 whether the content data quality needs verification. In some embodiments, the determination of whether particular content data quality needs verification is based in part on a confidence rating associated with the online source that provided the content. There are a variety of data quality signals upon which, alone or in combination, an online source confidence rating may be based. For example, in some embodiments, the content provided by a website that specializes in notifications of new business openings and that previously has published content that provided references to several new businesses may not need further verification. In embodiments, if the system determines 220 that the data quality of the received content does not need verification, data representing the referenced new business is stored 235 in the business repository.

In embodiments, if the system determines 220 that the data quality of the received content does need verification, the system submits 225 data representing the referenced new business for verification. As previously described with respect to FIG. 1, verification of a new business may be a manual process, an automatic process, or a combination. Verification of data quality may be based in part on attributes of the business (e.g. is the business location a valid address?), and/or on attributes of the received content (e.g. does the date indicate that this reference is stale?). In some embodiments, the system collects references to previously unknown businesses that were extracted from content received during a predetermined time period, e.g. a week, and then submits the set of collected references for verification. Additionally or alternatively, in some embodiments, the system submits a new business reference for verification directly after identifying the reference within received content.

In embodiments, if the system determines 230 that a reference to a previously unknown business is verified, data representing the referenced new business is stored 235 in the business repository.

In embodiments, a confidence rating is associated with each online source that has provided content referencing a previously unknown new business. In embodiments, the system updates 240 the confidence rating associated with the online source that provided the reference to the new business based in part on the content data quality verification results. For example, in embodiments, the system may increase a confidence rating if the new business reference is verified and, conversely, the system may decrease a confidence rating if the new business reference is not verified. In another example, the system may increase a confidence rating if content received from a particular online source is determined to include a relatively greater number of verified new business references than content received from other online sources within a predetermined time period. In some embodiments in which the source is associated with a source-specific classifier, the confidence rating is based in part on a percentage of successful determinations that content includes a new business reference.

The process ends 245 after the system updates the confidence rating.

Figure 3:
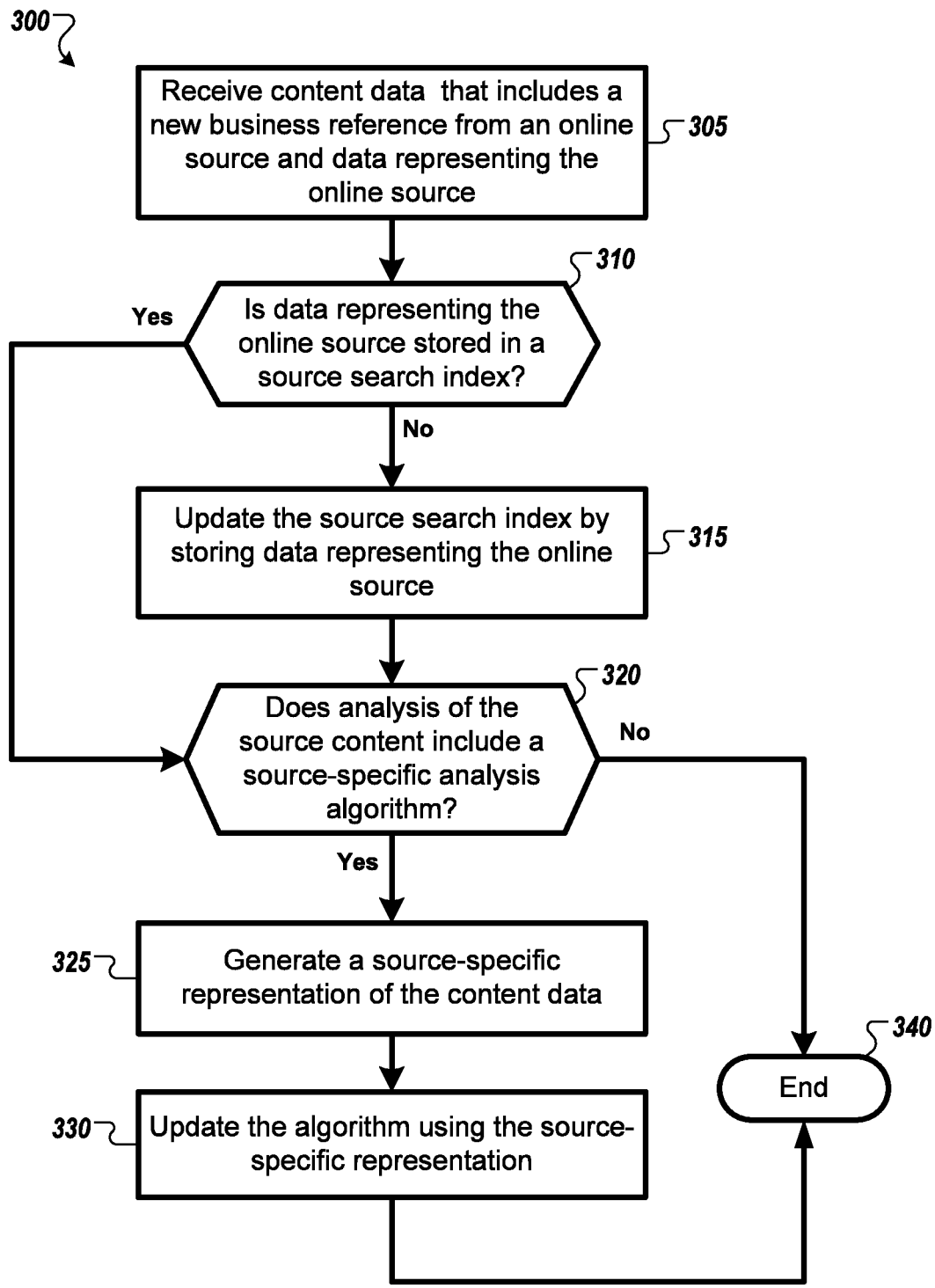
FIG. 3 is a flow diagram of an example method for performing analysis to identify online sources that are likely to include content referencing new businesses in accordance with some embodiments discussed herein.

FIG. 3 is a flow diagram of an example method 300 for performing analysis to identify online sources that are likely to include content referencing new businesses. For convenience, the method 300 will be described with respect to a system that includes one or more computing devices and performs the method 300. Specifically, the method 300 will be described with respect to processing of content data by the source content analysis module 160, the new business verification module 170, and the source index monitor 180 of system 100.

In embodiments, the system receives 305 content data that includes a new business reference and data representing the online source. As discussed with respect to FIG. 1, the received content data may have been extracted from a search result 134 or from a source feed 182, and the data representing the online source may be a link to a web page from that online source on which the content data were included.

In embodiments, the system determines 310 whether the online source is known to the system, i.e., whether data representing the online source is already stored in a source search index 120 maintained by the system. If the system determines 310 that the online source is not known, the system updates 315 the source search index 120 by storing the data representing the online source. In some embodiments, the system may subscribe to a content feed, e.g. an RSS feed, that is available from the online source.

In embodiments, the system determines 320 whether analysis of the online source content includes a source-specific analysis algorithm, as described previously with respect to method 200. The process ends 340 if the system determines 320 that analysis of the online source content does not include a source-specific analysis algorithm.

In embodiments, analysis of the online source content includes a source-specific trainable pattern recognition algorithm such as, for example, a trainable classifier. In embodiments, if the system determines 320 that analysis of the received online source content includes a source-specific analysis algorithm, the system generates 325 a source-specific representation of the content data that includes the new business reference and then updates 330 the algorithm using the generated source-specific representation. Referencing the trainable classifier example previously discussed with respect to FIG. 2, the system may update a source-specific trainable classifier by creating a new instance of the training data used to develop the classifier, updating the training data set by adding the new instance, and then using the updated training data set to adjust the classifier coefficients.

The process ends 340 after the system updates the algorithm.

Figure 4:
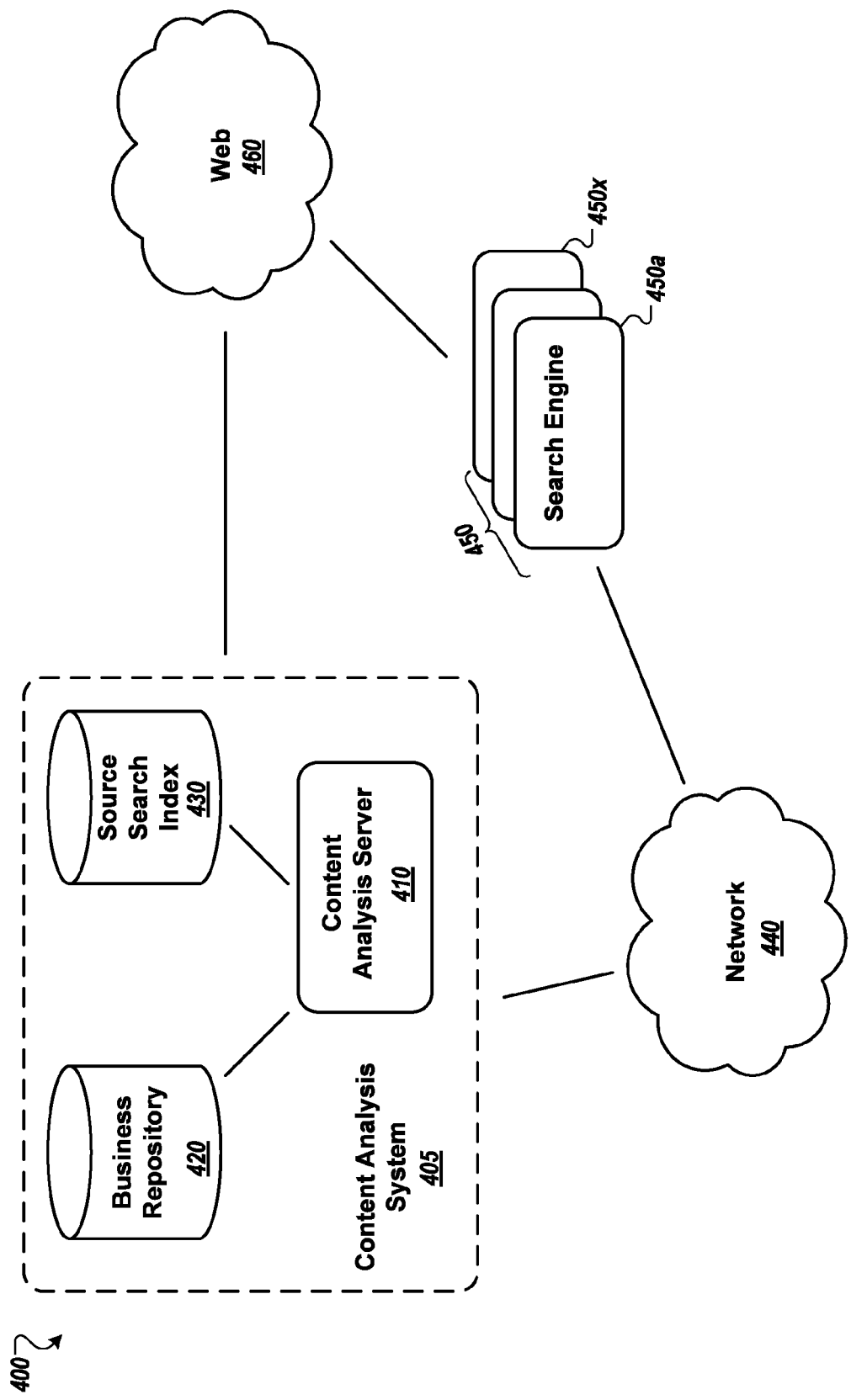
FIG. 4 illustrates an example network architecture for a new business identification system in accordance with some embodiments discussed herein.

FIG. 4 illustrates an exemplary network architecture 400 for a new business identification system, which may include one or more devices and sub-systems that are configured to implement some embodiments discussed herein. For example, system 400 may include content analysis system 405, which can include, for example, content analysis server 410, business repository 420, and source search index 430, among other things (not shown). Content analysis server 410 can be any suitable network server and/or other type of processing device. Business repository 420 can be any suitable network database configured to store new business data and/or analytics data, such as that discussed herein; and source search index 430 can be any suitable network database configured to store web online source data and/or analytics data, such as that discussed herein. In this regard, system 405 may include, for example, at least one backend data server, network database, and/or cloud computing device, among other things.

Figure 5:
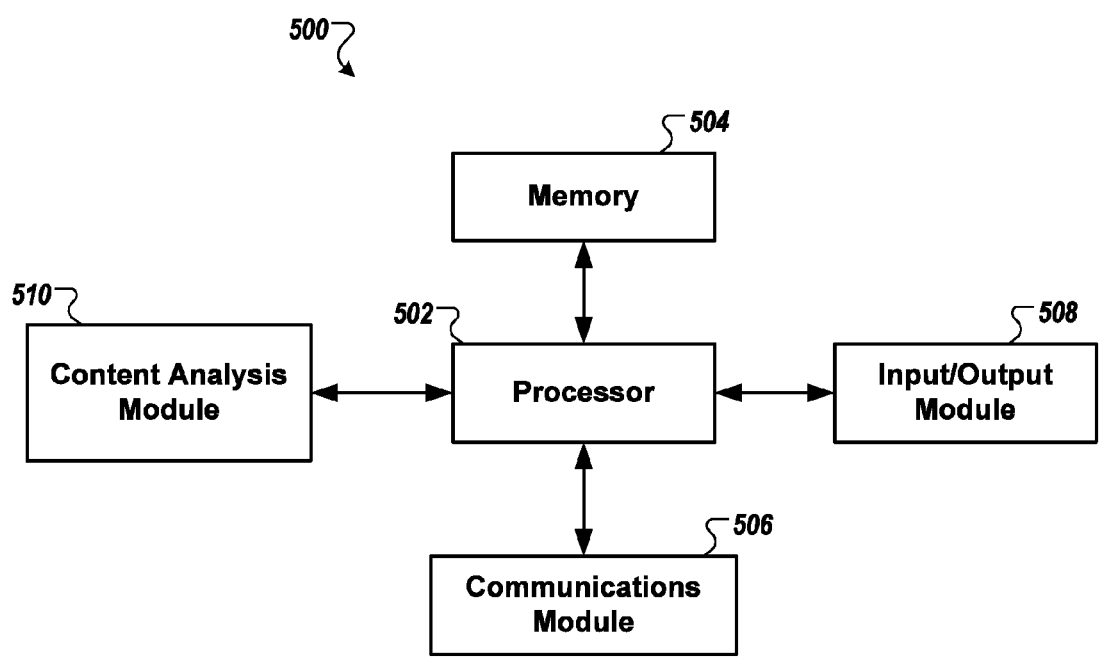
FIG. 5 illustrates a schematic block diagram of circuitry that can be included in a computing device, such as a content analysis system, in accordance with some embodiments discussed herein.

FIG. 5 shows a schematic block diagram of circuitry 500, some or all of which may be included in, for example, new business content identification system 405. As illustrated in FIG. 5, in accordance with some example embodiments, circuitry 500 can include various means, such as processor 502, memory 504, communications module 506, and/or input/output module 508. As referred to herein, "module" includes hardware, software and/or firmware configured to perform one or more particular functions. In this regard, the means of circuitry 500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 504) that is executable by a suitably configured processing device (e.g., processor 502), or some combination thereof.

Processor 502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 502 comprises a plurality of processors. The plurality of processors may be embodied on a single computing device or may be distributed across a plurality of computing devices collectively configured to function as circuitry 500. The plurality of processors may be in operative communication with each other and may be collectively configured to perform one or more functionalities of circuitry 500 as described herein. In an example embodiment, processor 502 is configured to execute instructions stored in memory 504 or otherwise accessible to processor 502. These instructions, when executed by processor 502, may cause circuitry 500 to perform one or more of the functionalities of circuitry 500 as described herein.

Whether configured by hardware, firmware/software methods, or by a combination thereof, processor 502 may comprise an entity capable of performing operations according to embodiments of the present invention while configured accordingly. Thus, for example, when processor 502 is embodied as an ASIC, FPGA or the like, processor 502 may comprise specifically configured hardware for conducting one or more operations described herein. Alternatively, as another example, when processor 502 is embodied as an executor of instructions, such as may be stored in memory 504, the instructions may specifically configure processor 502 to perform one or more algorithms and operations described herein, such as those discussed in connection with FIGS. 1-3.

Memory 504 may comprise, for example, volatile memory, non-volatile memory, or some combination thereof. Although illustrated in FIG. 5 as a single memory, memory 504 may comprise a plurality of memory components. The plurality of memory components may be embodied on a single computing device or distributed across a plurality of computing devices. In various embodiments, memory 504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 504 may be configured to store information, data (including analytics data), applications, instructions, or the like for enabling circuitry 500 to carry out various functions in accordance with example embodiments of the present invention. For example, in at least some embodiments, memory 504 is configured to buffer input data for processing by processor 502. Additionally or alternatively, in at least some embodiments, memory 504 is configured to store program instructions for execution by processor 502. Memory 504 may store information in the form of static and/or dynamic information. This stored information may be stored and/or used by circuitry 500 during the course of performing its functionalities.

Communications module 506 may be embodied as any device or means embodied in circuitry, hardware, a computer program product comprising computer readable program instructions stored on a computer readable medium (e.g., memory 504) and executed by a processing device (e.g., processor 502), or a combination thereof that is configured to receive and/or transmit data from/to another device, such as, for example, a second circuitry 500 and/or the like. In some embodiments, communications module 506 (like other components discussed herein) can be at least partially embodied as or otherwise controlled by processor 502. In this regard, communications module 506 may be in communication with processor 502, such as via a bus. Communications module 506 may include, for example, an antenna, a transmitter, a receiver, a transceiver, network interface card and/or supporting hardware and/or firmware/software for enabling communications with another computing device. Communications module 506 may be configured to receive and/or transmit any data that may be stored by memory 504 using any protocol that may be used for communications between computing devices. Communications module 506 may additionally or alternatively be in communication with the memory 504, input/output module 508 and/or any other component of circuitry 500, such as via a bus.

Input/output module 508 may be in communication with processor 502 to receive an indication of a user input and/or to provide an audible, visual, mechanical, or other output to a user. Some example visual outputs that may be provided to a user by circuitry 500 are discussed in connection with FIG. 1. As such, input/output module 508 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 500 is embodied as a server or database, aspects of input/output module 508 may be reduced as compared to embodiments where circuitry 500 is implemented as an end-user machine or other type of device designed for complex user interactions. In some embodiments (like other components discussed herein), input/output module 508 may even be eliminated from circuitry 500. Alternatively, such as in embodiments wherein circuitry 500 is embodied as a server or database, at least some aspects of input/output module 508 may be embodied on an apparatus used by a user that is in communication with circuitry 500, such as for example, pharmacy terminal 108. Input/output module 508 may be in communication with the memory 504, communications module 506, and/or any other component(s), such as via a bus. Although more than one input/output module and/or other component can be included in circuitry 500, only one is shown in FIG. 5 to avoid overcomplicating the drawing (like the other components discussed herein).

Content analysis module 510 may also or instead be included and configured to perform the functionality discussed herein related to the identification of new businesses from analysis of web content discussed above. In some embodiments, some or all of the functionality of content analysis may be performed by processor 502. In this regard, the example processes and algorithms discussed herein can be performed by at least one processor 502 and/or content analysis module 510. For example, non-transitory computer readable media can be configured to store firmware, one or more application programs, and/or other software, which include instructions and other computer-readable program code portions that can be executed to control each processor (e.g., processor 502 and/or content analysis module 510) of the components of system 400 to implement various operations, including the examples shown above. As such, a series of computer-readable program code portions are embodied in one or more computer program products and can be used, with a computing device, server, and/or other programmable apparatus, to produce machine-implemented processes.

For example, content analysis module 510 can be configured to analyze structured and/or unstructured content included within search results and/or content feeds returned from online sources in order to recognize and identify references to new businesses as well as recognize and identify additional online sources that are likely to provide additional references to new businesses. In this way, content analysis module 510 may support multiple analysis algorithms, such as those discussed above, so that the selected algorithm may be chosen at runtime. Further, the present configuration can enable flexibility in terms of configuring analysis of structured and/or unstructured content. Alternatively and/or additionally, the content analysis module 510 may analyze data representing a business to verify the quality of the data and/or the quality of the business.

In some embodiments, analysis of content received from a particular online source may include at least one source-specific analysis algorithm for determining whether the content includes references to one or more new businesses. For example, as described above, a particular online source may be associated with a classifier that receives a source-specific representation of the content as input and produces output classifying that input as either including or not including a new business reference. In some embodiments, the classifier is a trainable classifier and the source-specific representation of the content may be used to update a training data set being used to optimize the fit of the classifier to the classification task. In another example, at least one of a variety of well-known clustering methods may be applied to a source-specific representation of the received content. It is well known in the art that a variety of source-specific analysis algorithms exist, and that the selection of one or more source-specific algorithms to apply to analysis of content received from a particular online source is not critical to the invention.

In some embodiments, the content analysis module 510 associates a confidence score with each online source to represent the data quality of content received from that source. In some embodiments, the confidence score associated with a particular online source may be based in part on the percentage of times that a previously undiscovered new business reference is identified in content received from that source. In some embodiments, the confidence score associated with a particular online source is the basis for determining whether to store data representing a new business that has been referenced within the content provided by the online source.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 400. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 502 and/or content analysis module 510 discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 504) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A server configured for automatically identifying references to a new business within published content returned from an online source over a network, the server comprising at least one processor and at least one memory including computer program code, the at least one memory and the computer program code configured to, with the at least one processor, cause the server to:

store business data describing previously identified new businesses in a business repository;

store data that represent online sources that have published content referencing previously identified businesses in a source search index;

receive search results returned by a search engine in response to receiving a submitted query via a plurality of search query interfaces, and;

identify and extract references to new businesses that are included in published content included in the received search results by applying a pattern recognition algorithm that is configured to process one or more text patterns extracted from the published content, wherein a new business is one of a newly opened business or a business that is about to open;

verify each of a set of new businesses in the extracted references by determining whether data representing the new business is already stored in the business repository; and maintain the source search index.

2. The server of claim 1, wherein the business repository is instantiated by storing data representing previously identified new businesses, wherein the seed data describing each previously identified new business includes at least one of the group of business attributes including business name, type of business, and business location.

3. The server of claim 1, wherein the plurality of search query interfaces is configured to access a combination of public search engines and proprietary search engines.

4. The server of claim 3, wherein each search query interface is configured to generate the submitted query in a format specified by either the public search engine or proprietary the search engine.

5. The server of claim 3, wherein the submitted query includes at least one search term retrieved from a keyword search of content published by an online source.

6. The server of claim 1, wherein the server is further caused to select a pattern recognition algorithm based in part on determining whether the published content is structured content or unstructured content.

7. The server of claim 6 wherein the server is further caused to select the pattern recognition algorithm based on recognizing source-specific data representation patterns in an instance in which the published content is unstructured content.

8. The server of claim 7, wherein the server is further caused to recognize source-specific data representation patterns based on identifying at least one of a group of text patterns including particular keywords or phrases, dates, a name of a chef, and a particular location.

9. The server of claim 7, wherein the pattern recognition algorithm is a trainable function generated using machine learning.

10. The server of claim 6 wherein the server is further caused to select the pattern recognition algorithm based on patterns of structuring of the published content in an instance in which the published content is structured content.

11. The server of claim 1, wherein the server is further caused to verify a new business reference using automatic content analysis comprising checking one or more additional online sources for an indication of the new business and generating an automated electronic communication to the new business.

12. The server of claim 1, wherein the server is further caused to maintain the source search index by:

receiving source data, extracted from the search results, describing one or more online sources;

calculating at least one source data quality signal for each online source using the extracted source data and whether the new business reference was verified; and for each online source, updating a confidence rating associated with the online source using the data signal.

13. The server of claim 1, wherein the server is further caused to maintain the source search index by pruning the source search index to remove online sources that have not included any further new business references within a predetermined period of time.

* * * * *